US008970659B1

(12) United States Patent
Anderson et al.

(10) Patent No.: US 8,970,659 B1
(45) Date of Patent: Mar. 3, 2015

(54) METHODS AND SYSTEMS FOR SECURE MEDIA-BASED CONFERENCING

(71) Applicant: Edifire LLC, Boston, MA (US)

(72) Inventors: Eric Anderson, Grafton, MA (US); Marc Rudkowski, Apex, NC (US); Daniel P. Goepp, Boston, MA (US)

(73) Assignee: Edifire LLC, Boston, MA (US)

( * ) Notice: Subject to any disclaimer, the term of this patent is extended or adjusted under 35 U.S.C. 154(b) by 0 days.

(21) Appl. No.: 14/289,109

(22) Filed: May 28, 2014

Related U.S. Application Data

(60) Provisional application No. 61/889,926, filed on Oct. 11, 2013.

(51) Int. Cl.
*H04N 7/15* (2006.01)

(52) U.S. Cl.
CPC .................................. *H04N 7/152* (2013.01)
USPC ........................................ 348/14.09; 370/261

(58) Field of Classification Search
CPC ...... H04N 7/15; H04N 7/152; H04L 12/1827; H04L 12/1818; H04M 3/56
USPC ...................... 348/14.09, 14.08; 370/260–261
See application file for complete search history.

(56) References Cited

U.S. PATENT DOCUMENTS

| | | | |
|---|---|---|---|
| 6,404,873 B1 | 6/2002 | Beyda et al. | |
| 6,633,324 B2 | 10/2003 | Stephens, Jr. | |
| 7,058,168 B1 | 6/2006 | Knappe et al. | |
| 7,243,123 B1 | 7/2007 | Allen et al. | |
| 7,466,812 B1 * | 12/2008 | Mahy et al. | 379/202.01 |
| 7,656,824 B2 | 2/2010 | Wang et al. | |
| 7,657,021 B2 | 2/2010 | Flockhart et al. | |
| 7,792,063 B2 | 9/2010 | Dahle | |
| 8,079,079 B2 | 12/2011 | Zhang et al. | |
| 8,259,152 B2 | 9/2012 | Eriksson et al. | |
| 8,300,557 B2 | 10/2012 | Sekaran et al. | |
| 8,380,790 B2 | 2/2013 | Lee et al. | |
| 8,390,669 B2 | 3/2013 | Catchpole et al. | |
| 8,433,050 B1 | 4/2013 | Baten et al. | |
| 8,487,976 B2 | 7/2013 | Kenoyer | |
| 8,489,887 B1 | 7/2013 | Newman et al. | |
| 8,526,336 B2 | 9/2013 | Sarkar et al. | |
| 8,605,878 B2 | 12/2013 | Claudatos et al. | |
| 2002/0136166 A1 | 9/2002 | Armbruster et al. | |
| 2005/0018826 A1 | 1/2005 | Benco et al. | |
| 2005/0276406 A1 | 12/2005 | Keohane et al. | |

(Continued)

OTHER PUBLICATIONS (C3) Non-Final Office Action from U.S. Appl. No. 14/480,091 dated Oct. 22, 2014, 7 pages.

(Continued)

*Primary Examiner* — Stella Woo
(74) *Attorney, Agent, or Firm* — Proskauer Rose LLP

(57) ABSTRACT

Methods and apparatuses, including computer program products, are described for media-based (e.g., video and/or audio) conferencing between a plurality of end point devices. The methods and apparatuses provide for secure conferencing while offering a robust feature set that provides call enhancement features such as interactive voice response (IVR) functionality and auto attendance, call security features such as password management, multi-factor authentication and authorization of end points (including filtering and allow/deny functionality), and call compliance features such as recording options, regulatory rules, and other retention/surveillance features.

27 Claims, 7 Drawing Sheets

(56) References Cited

U.S. PATENT DOCUMENTS

| | | |
|---|---|---|
| 2006/0164507 A1 | 7/2006 | Eshkoli et al. |
| 2006/0259755 A1 | 11/2006 | Kenoyer |
| 2006/0285670 A1 | 12/2006 | Chin et al. |
| 2007/0047715 A1 | 3/2007 | Madhusudan et al. |
| 2007/0124760 A1 | 5/2007 | Novak et al. |
| 2007/0172045 A1 | 7/2007 | Nguyen et al. |
| 2008/0159490 A1 | 7/2008 | Gaudin et al. |
| 2008/0219426 A1 | 9/2008 | Lai |
| 2009/0028316 A1 | 1/2009 | Jaiswal et al. |
| 2009/0179983 A1* | 7/2009 | Schindler ............. 348/14.08 |
| 2009/0220064 A1 | 9/2009 | Gorti et al. |
| 2009/0220066 A1 | 9/2009 | Shaffer et al. |
| 2010/0061539 A1 | 3/2010 | Cloran et al. |
| 2010/0128641 A1 | 5/2010 | Karnalkar et al. |
| 2010/0153497 A1 | 6/2010 | Sylvain et al. |
| 2011/0273526 A1 | 11/2011 | Mehin et al. |
| 2011/0279634 A1 | 11/2011 | Periyannan et al. |
| 2012/0072499 A1 | 3/2012 | Cipolli et al. |
| 2012/0140681 A1 | 6/2012 | Kaminsky et al. |
| 2012/0147127 A1 | 6/2012 | Satterlee et al. |
| 2012/0262530 A1 | 10/2012 | Whitfield et al. |
| 2013/0027504 A1 | 1/2013 | Zhang |
| 2013/0106989 A1* | 5/2013 | Gage et al. ............. 348/14.09 |
| 2013/0133049 A1 | 5/2013 | Peirce |
| 2013/0329970 A1 | 12/2013 | Irie et al. |
| 2013/0335515 A1 | 12/2013 | Wamorkar et al. |
| 2014/0111596 A1 | 4/2014 | Grevers, Jr. |
| 2014/0289834 A1 | 9/2014 | Lindemann |

OTHER PUBLICATIONS (C2) Non-Final Office Action from co-pending U.S. Appl. No. 14/289,122 dated Aug. 21, 2014, 14 pages.

* cited by examiner

METHODS AND SYSTEMS FOR SECURE MEDIA-BASED CONFERENCING

RELATED APPLICATIONS

This application claims priority to U.S. Provisional Patent Application No. 61/889,926, filed on Oct. 11, 2013, which is incorporated herein in its entirety.

FIELD OF THE INVENTION

This application relates generally to methods and apparatuses, including computer program products, for secure media-based conferencing.

BACKGROUND

Media-based (i.e., video and/or audio) conferencing has traditionally lacked security, call enhancement, and interoperability features. Typically, conference calls occur over private networks between end points that are known to the network and call conferencing system, and have already been authenticated. In some cases, these private networks operate on a proprietary software and/or hardware platform from a specific vendor, making it difficult for end points outside of the scope of the proprietary technology to access the call conferencing platform. In addition, typical conference call signaling is exchanged directly between the end points, which makes security of the signaling harder to achieve.

SUMMARY OF THE INVENTION

Therefore, what is needed are methods and systems to conduct secure media-based conferencing while offering a robust feature set that provides call enhancement features such as interactive voice response (IVR) functionality and auto attendance, call security features such as password management, multi-factor authentication and authorization of end points (including filtering and allow/deny functionality), and call compliance features such as recording options, regulatory rules, and other retention/surveillance features. The systems and methods described herein provide the advantage of interrupting the signaling associated with a media-based conference call to provide dynamic decision-making with respect to routing, permissions, authentication, and the like. The systems and methods described herein provide the advantage of secure multi-factor authentication of end points connecting to the call conferencing system. The systems and methods described herein provide the advantage of media-based conferencing with seamless interoperability between end points operating on varying types of software and hardware platforms.

The systems and methods described herein provide the advantage of dynamically allocating hardware and software resources of the system to ensure availability and efficient routing of media-based conference calls. For example, the hardware and software resources allocated by the systems and methods described herein can be resident on a plurality of geographically-dispersed and independent nodes (e.g., not in the same physical area) that communicate via a mesh-based framework. This attribute enables the system to provide the advantage of a componentized call system, instead of the traditional 'single-box' systems commonly used. Further, the processes and modules that comprise the system can operate independently of each other, without relying on other nodes or modules of the system, in making decisions about which actions to take with respect to a given conference call, end point device, or user. The systems and methods described herein achieve the advantage of disassociating the 'conference call' from any specific physical infrastructure.

The systems and methods described herein provide the further advantage of enabling private sub-conferences between participants to a main conference call while applying each of the authentication, enhancement, and regulatory features set forth above.

The invention, in one aspect, features a computerized method for media-based conferencing between a plurality of end point devices. A call processing module in a server computing device receives a request to establish a conference call between a plurality of end point devices, the request received from an originating end point device. The call processing module allocates a conference call resource identifier to the originating end point device. The call processing module determines conference call attributes based upon one or more of: technical specifications of the originating end point device, an identity of a user associated with the originating end point device, a geographic location of the originating end point device, and the request to establish the conference call. The call processing module determines an availability of conference call resources based upon the determined conference call attributes. The call processing module transmits the conference call resource identifier to the originating end point device if conference call resources are available. The call processing module transmits the determined conference call attributes to a media module in the server computing device. The media module establishes a signaling connection between the originating end point device and a conference session module in the server computing device for initiation of a conference media flow. The conference session module connects other end point devices to the conference call based upon the determined conference call attributes.

The invention, in another aspect, features a system for media-based conferencing between a plurality of end point devices. The system includes a server computing device configured to receive, at a call processing module, a request to establish a conference call between a plurality of end point devices, the request received from an originating end point device. The server computing device is configured to allocate, by the call processing module, a conference call resource identifier to the originating end point device. The server computing device is configured to determine, by the call processing module, conference call attributes based upon one or more of: technical specifications of the originating end point device, an identity of a user associated with the originating end point device, a geographic location of the originating end point device, and the request to establish the conference call. The server computing device is configured to determine, by the call processing module, an availability of conference call resources based upon the determined conference call attributes. The server computing device is configured to transmit, by the call processing module, the conference call resource identifier to the originating end point device if conference call resources are available. The server computing device is configured to transmit, by the call processing module, the determined conference call attributes to a media module in the server computing device. The server computing device is configured to establish, by the media module, a signaling connection between the originating end point device and a conference session module in the server computing device for initiation of a conference media flow. The server computing device is configured to connect, by the conference session module, other end point devices to the conference call based upon the determined conference call attributes.

The invention, in another aspect, features a computer program product, tangibly embodied in a non-transitory computer readable storage device, for media-based conferencing between a plurality of end point devices. The computer program product includes instructions operable to cause a server computing device to receive, at a call processing module, a request to establish a conference call between a plurality of end point devices, the request received from an originating end point device. The computer program product includes instructions operable to cause the server computing device to allocate, by the call processing module, a conference call resource identifier to the originating end point device. The computer program product includes instructions operable to cause the server computing device to determine, by the call processing module, conference call attributes based upon one or more of: technical specifications of the originating end point device, an identity of a user associated with the originating end point device, a geographic location of the originating end point device, and the request to establish the conference call. The computer program product includes instructions operable to cause the server computing device to determine, by the call processing module, an availability of conference call resources based upon the determined conference call attributes. The computer program product includes instructions operable to cause the server computing device to transmit, by the call processing module, the conference call resource identifier to the originating end point device if conference call resources are available. The computer program product includes instructions operable to cause the server computing device to transmit, by the call processing module, the determined conference call attributes to a media module in the server computing device. The computer program product includes instructions operable to cause the server computing device to establish, by the media module, a signaling connection between the originating end point device and a conference session module in the server computing device for initiation of a conference media flow. The computer program product includes instructions operable to cause the server computing device to connect, by the conference session module, other end point devices to the conference call based upon the determined conference call attributes.

Any of the above aspects can include one or more of the following features. In some embodiments, the request to establish a conference call can include an originating end point identifier, a destination end point identifier, a conference identifier, a signaling protocol attribute, a conference call hardware platform used by the originating end point device, and a conference call software platform used by the originating end point device. In some embodiments, the call processing module maps the originating end point device to the identity of the user associated with the originating end point device. In some embodiments, determining conference call attributes includes determining, from a database coupled to the call processing module, permissions for the user associated with the originating end point device based upon the identity of the user associated with the originating end point device.

In some embodiments, the permissions define access to conference call routing functions provided by the server computing device, access to conference call enhancement functions provided by the server computing device, access to conference call recipients, access to hardware resources provided by the server computing device, and access to software resources provided by the server computing device. In some embodiments, the conference call resource identifier is associated with a conference call software platform used by the originating end point device to transmit the request to establish the conference call. In some embodiments, the connecting step includes receiving, by the conference session module, requests from other end point devices to join the conference call. In some embodiments, the call processing module modifies the conference call resource identifier based upon a destination end point identifier associated with the request to establish the conference call.

In some embodiments, the step of establishing, by the media module, a signaling connection includes translating, by the media module, a first signaling protocol used by the originating end point device into a second signaling protocol used by the conference call. In some embodiments, the request to establish a conference call includes user identification credentials associated with the user of the originating end point device. In some embodiments, the call processing module authenticates the user of the originating end point device based upon the user identification credentials. In some embodiments, the originating end point device operates a different conference call software platform than at least one of the other end point devices. In some embodiments, the server computing device is comprised of a plurality of independent, geographically-dispersed nodes.

The invention, in another aspect, features a computerized method for establishing a sub-conference between a plurality of end point devices participating in a media-based conference call. A server computing device receives a request to establish a sub-conference from a first end point device participating in a main conference call, the request including an identifier associated with a second end point device participating in the main conference call. The server computing device initiates a call instance separate from the main conference call based upon the request to establish the sub-conference. The server computing device couples the first end point device and the second end point device to the separate call instance without separating the first end point device and the second end point device from the main conference call. The server computing device establishes a signaling and media flow between the first end point device and second end point device, wherein the main conference call is prevented from accessing the signaling and media flow between the first end point device and the second end point device.

The invention, in another aspect, features a system for establishing a sub-conference between a plurality of end point devices participating in a media-based conference call. The system includes a server computing device configured to receive a request to establish a sub-conference from a first end point device participating in a main conference call, the request including an identifier associated with a second end point device participating in the main conference call. The server computing device is configured to initiate a call instance separate from the main conference call based upon the request to establish the sub-conference. The server computing device is configured to couple the first end point device and the second end point device to the separate call instance without separating the first end point device and the second end point device from the main conference call. The server computing device is configured to establish a signaling and media flow between the first end point device and second end point device, wherein the main conference call is prevented from accessing the signaling and media flow between the first end point device and the second end point device.

The invention, in another aspect, features a computer program product, tangibly embodied in a computer readable storage device, for establishing a sub-conference between a plurality of end point devices participating in a media-based conference call. The computer program product includes instructions operable to cause a server computing device to receive a request to establish a sub-conference from a first end point device participating in a main conference call, the request including an identifier associated with a second end point device participating in the main conference call. The computer program product includes instructions operable to cause the server computing device to initiate a call instance separate from the main conference call based upon the request to establish the sub-conference. The computer program product includes instructions operable to cause the server computing device to couple the first end point device and the second end point device to the separate call instance without separating the first end point device and the second end point device from the main conference call. The computer program product includes instructions operable to cause the server computing device to establish a signaling and media flow between the first end point device and second end point device, wherein the main conference call is prevented from accessing the signaling and media flow between the first end point device and the second end point device.

Any of the above aspects can include one or more of the following features. In some embodiments, the server computing device transmits a request to join a sub-conference to the second end point device based upon the identifier associated with the second end point device. In some embodiments, the initiating a call instance step includes notifying, by the server computing device, other end point devices participating in the main conference call of the request to establish a sub-conference from the first end point device. In some embodiments, the notifying step includes changing presence information associated with the first end point device and the second end point device, the presence information viewable by the other end point devices participating in the main conference call.

In some embodiments, the server computing device authenticates at least one of the first end point device and the second end point device prior to coupling the first end point device to the second end point device to the separate call instance. In some embodiments, the server computing device records the media exchanged between the first end point device and the second end point device via the separate call instance. In some embodiments, the server computing device determines one or more rules associated with initiating the separate call instance. In some embodiments, the server computing device does not initiate the separate call instance if the request to establish the sub-conference is not in compliance with one of the rules. In some embodiments, the one or more rules are based upon privacy requirements and/or regulatory requirements. In some embodiments, the end point devices participating in the main conference call agree on the rules.

In some embodiments, the server computing device determines one or more context attributes of the main conference call, and applies the one or more context attributes to the separate call instance. In some embodiments, the one or more context attributes include call routing features, call enhancement features, signaling protocol attributes, transcoding, and recording attributes.

In some embodiments, the media exchanged between the first end point device and second end point device is audio information. In some embodiments, the media exchanged between the first end point device and second end point device is video information and audio information. In some embodiments, the media exchanged between the first end point device and second end point device is textual information.

The invention, in another aspect, features a computerized method for authenticating an end point device participating in a media-based conference call. A call processing module of a server computing device receives a request to establish a media-based conference call between a plurality of end point devices, the request including credentials associated with a user of a first end point device and attributes associated with the end point device. The call processing module determines an identity of the user of the first end point device based upon the credentials. The call processing module determines a level of conference call access based upon the attributes associated with the first end point device. The call processing module retrieves a user profile based upon the identity of the user, the user profile including a set of permissions associated with conference call functionality. The call processing module determines whether to connect the first end point device to a conference call based upon the user profile and the level of conference call access.

The invention, in another aspect, features a system for authenticating an end point device participating in a media-based conference call. The system includes a server computing device configured to receive, at a call processing module of the server computing device, a request to establish a conference call between a plurality of end point devices, the request including credentials associated with a user of a first end point device and attributes associated with the end point device. The server computing device is configured to determine, at the call processing module, an identity of the user of the first end point device based upon the credentials. The server computing device is configured to determine, at the call processing module, a level of conference call access based upon the attributes associated with the first end point device. The server computing device is configured to retrieve, by the call processing module, a user profile based upon the identity of the user, the user profile including a set of permissions associated with conference call functionality. The server computing device is configured to determine, by the call processing module, whether to connect the first end point device to a conference call based upon the user profile and the level of conference call access.

The invention, in another aspect, features a computer program product, tangibly embodied in a non-transitory computer readable storage device, for authenticating an end point device participating in a media-based conference call. The computer program product includes instructions operable to cause a server computing device to receive, at a call processing module of the server computing device, a request to establish a conference call between a plurality of end point devices, the request including credentials associated with a user of a first end point device and attributes associated with the end point device. The computer program product includes instructions operable to cause the server computing device to determine, at the call processing module, an identity of the user of the first end point device based upon the credentials. The computer program product includes instructions operable to cause the server computing device to determine, at the call processing module, a level of conference call access based upon the attributes associated with the first end point device. The computer program product includes instructions operable to cause the server computing device to retrieve, by the call processing module, a user profile based upon the identity of the user, the user profile including a set of permissions associated with conference call functionality. The computer program product includes instructions operable to cause the server computing device to determine, by the call processing module, whether to connect the first end point device to a conference call based upon the user profile and the level of conference call access.

Any of the above aspects can include one or more of the following features. In some embodiments, the credentials associated with the user of the first end point device include a password, a user name, a certificate, or a biometric feature. It should be appreciated that other credentials can be associated with the user and used in conjunction with the above aspects without departing from the scope of invention. In some embodiments, the credentials are supplied by the user of the first end point device at the time the request is transmitted. In some embodiments, the credentials are determined automatically by the first end point device.

In some embodiments, the attributes of the first end point device include a device identifier, a location, or an originating address. In some embodiments, determining the level of conference call access includes determining hardware and/or software resources available for use by the first end point device and determining hardware and/or software resources not available for use by the first end point device. In some embodiments, the step of determining the identity of the user of the first end point device includes retrieving an identifier associated with the user from a database based upon the credentials.

In some embodiments, the user profile is retrieved from a directory. In some embodiments, the directory is based upon the Lightweight Directory Access Protocol (LDAP). In some embodiments, the directory is based upon the Active Directory (AD) service. In some embodiments, the directory is based upon the Security Assertion Markup Language (SAML) data format. It should be appreciated that other types of directories can be used in conjunction with the above aspects without departing from the scope of invention.

In some embodiments, the user profile includes rules to define conference calls in which the user is able to participate. In some embodiments, the set of permissions includes a list of destination end point devices to which the first end point device is able to connect, a list of destination end point devices to which the first end point device is not able to connect, a list of users to which the first end point device is able to connect, and a list of users to which the first end point device is not able to connect.

In some embodiments, the call processing module repeats authentication of the first end point device periodically during a conference call. In some embodiments, the call processing module performs multi-factor authentication.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
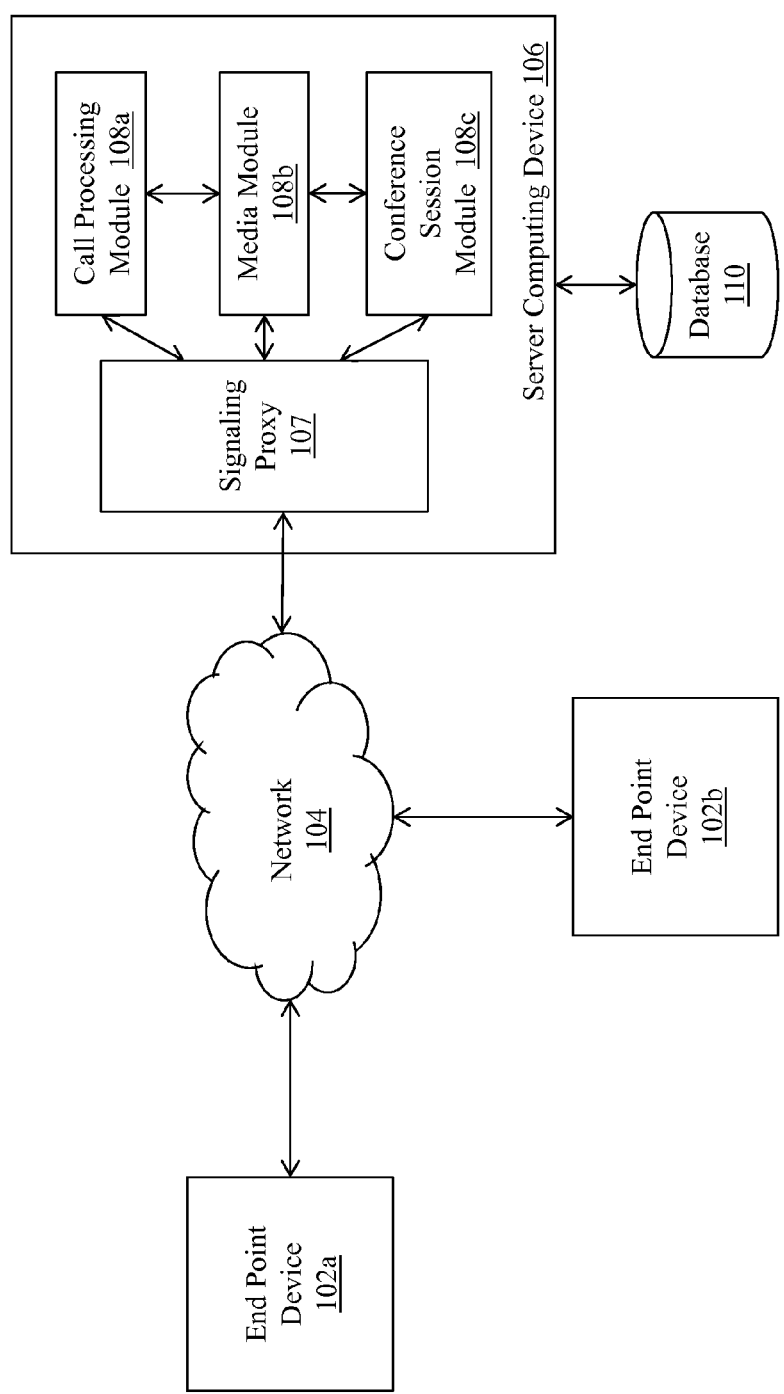
FIG. 1 is a block diagram of a system for media-based conferencing between a plurality of end point devices, according to an embodiment of the invention.

FIG. 1 is a block diagram of a system 100 for media-based conferencing between a plurality of end point devices, according to an embodiment of the invention. The system 100 includes a plurality of end point devices 102a-102b, a communications network 104, a server computing device 106 that includes a signaling proxy 107, a call processing module 108a, a media module 108b, and a conference session module 108c, and a database 110.

The plurality of end point devices 102a-102b connect to the server computing device 106 via the communications network 104 in order to initiate and participate in conference calls and other media communication sessions with other end points. Exemplary end point devices include desktop computers, laptop computers, tablets, mobile devices, smartphones, and internet appliances. It should be appreciated that other types of computing devices that are capable of connecting to the server computing device 106 can be used without departing from the scope of invention. In some embodiments, the end point devices 102a-102b are capable of executing call conferencing client software locally and/or using another type of user interface (e.g., a web browser) to connect to the server computing device 106. The call conferencing client software can be open network, free-to-use/freemium software, such as Skype™ available from Microsoft Corp. of Redmond, Wash. or Google™ Hangouts available from Google, Inc. of Mountain View, Calif., or purchasable, closed network software, such as the RealPresence® platform available from Polycom, Inc. of San Jose, Calif. In some embodiments, the call conferencing client software can be a proprietary platform developed, e.g., by a corporation for use internally. Although FIG. 1 depicts two end point devices 102a-102b, it should be appreciated that the system 100 can include any number of end point devices.

The communication network 104 enables the end point devices 102a-102b to communicate with the server computing device 106 in order to initiate and participate in media-based conference calls and meetings. The network 104 may be a local network, such as a LAN, or a wide area network, such as the Internet and/or a cellular network. In some embodiments, the network 104 is comprised of several discrete networks and/or sub-networks (e.g., cellular Internet) that enable the end point devices 102a-102b to communicate with the server computing device 106.

The server computing device 106 is a combination of hardware and software modules that establish, authorize, facilitate and manage media-based conference calls and meetings between a plurality of end point devices 102a-102b. The server computing device 106 includes a signaling proxy 107, a call processing module 108a, a media module 108b, and a conference session module 108c. The proxy 107 and modules 108a-108c are hardware and/or software modules that reside on the server computing device 106 to perform functions associated with establishing, authorizing, facilitating, and managing media-based conference calls and meetings. In some embodiments, the functionality of the proxy 107 and the modules 108a-108c is distributed among a plurality of computing devices. It should be appreciated that any number of computing devices, arranged in a variety of architectures, resources, and configurations (e.g., cluster computing, virtual computing, cloud computing) can be used without departing from the scope of the invention. It should also be appreciated that, in some embodiments, the functionality of the proxy 107 and the modules 108a-108c can be distributed such that any of the proxy 107 and/or the modules 108a-108c are capable of performing any of the functions described herein without departing from the scope of the invention. For example, in some embodiments, the functionality of the proxy 107 and/or the modules 108a-108c can be merged into a single module or, in some embodiments, the modules 108a-108c can be merged into a single module coupled to the proxy 107.

The signaling proxy 107 is coupled between the end point devices 102a-102b and the modules 108a-108c. The proxy 107 receives signaling communications in various protocols (e.g., Session Initiation Protocol (SIP), h.323) from the end point devices 102a-102b that relate to the establishment and maintenance of media-based conference call sessions. It should be appreciated that other signaling protocols can be used without departing from the scope of invention. The proxy 107 receives the signaling communications from the end point devices 102a-102b and transmits the signaling to the modules 108a-108c for further processing.

In some embodiments, the proxy 107 translates the signaling into another format that can be processed by the modules 108a-108c. For example, the proxy 107 can translate the signaling into XML format, including items such as call details (e.g., to, from, domain), end point device-specific details, user-specific details, and other types of information, thereby offering additional customization of the signaling to enable the modules 108a-108c to process the call in a dynamic way for each end point device 102a-102b.

Upon receiving the signaling from the proxy 107, the call processing module 108a can perform a number of different actions to process the call. In some embodiments, the call processing module 108a analyzes the signaling and redirects the call to other resources in the system 100 for further processing. For example, the call processing module 108a can determine that the inbound call signaling is originating from an end point device that is operating a specific call conferencing hardware and/or software platform. Based upon the platform determination, the call processing module 108a can redirect the signaling to a resource in the system that is capable of communicating with the platform of the end point device 102a. In some embodiments, the call processing module 108a returns a response to the end point device 102a that originated the signaling, where the response includes call routing data (e.g., a URI) for the end point device to re-route the signaling. In some embodiments, the call processing module 108 returns a response to the proxy 107 (e.g., XML) and the proxy 107 handles the routing of the signaling session to the destination end point device.

In some embodiments, the call processing module 108a uses the signaling to identify a user of the originating end point device 102a and/or the type of end point device 102a that originated the signaling. For example, the call processing module 108a can utilize data in the signaling, such as the 'to' address, the 'from' address, a device identifier, a user ID, and the like, to determine the identity of a user associated with the originating end point device or the destination end point device. The call processing module 108a can access the database 110 to look up details of the user based upon any of the above data points. For example, if the signaling includes a 'to' address, the call processing module 108a can search in the database 110 for a user profile associated with the 'to' address. In this way, the call processing module 108a maps the signaling to a user and can then leverage its capabilities to customize the conference experience based upon that user's identity.

In another example, the call processing module 108a can use the signaling to determine the technical capability of the end point device 102a and adjust the conferencing features and options available to that end point device. The signaling can include a data point that indicates the originating end point device 102a has limited network bandwidth for sending and receiving data. The call processing module 108a can upgrade or downgrade the fidelity of the media transmitted to the originating end point device 102a based upon the available bandwidth capabilities of the device 102a.

In another example, the call processing module 108a can use the signaling to determine a user associated with the end point device (as described above) and then perform authentication of the end point device/user to determine the level of access that the user has on the system 100. For example, the call processing module 108a can determine that the user is restricted from establishing media-based conference calls with a specified list of destinations (e.g., people, devices, physical locations). Based upon the determination of these restrictions, the call processing module 108a can evaluate whether to establish the conference call between the originating end point device 102a and the destination end point device specified in the signaling.

As described above, the server computing device 106 also includes a media module 108b. The media module is coupled to the proxy 107 and the other modules 108a and 108c. The media module 108b performs media signaling and streaming functionality, including acting as a call termination and streaming point. In some embodiments, the media module 108b performs functions to locate an intermediate point (e.g., server device) between the participating end point devices to anchor the media and may not process the media flow. In some embodiments, once the call processing module 108a has established the conference call between a plurality of end point devices based upon the signaling, the call processing module 108a can transfer the media associated with the call to the media module 108b for handling the media session between the end point devices. The media module 108b also provides additional conference call enhancement features, such as Interactive Voice Response (IVR) menus and prompts, auto-attendants, and advanced PIN management.

In some embodiments, the media module 108b includes private branch exchange (PBX) software for managing the media signaling and flows of conference calls processed by the server computing device 106. An example PBX software platform that can be incorporated into the media module is Asterisk®, available from Digium, Inc. of Huntsville, Ala.

The server computing device 106 also includes a conference session module 108c. The conference session module 108c is coupled to the proxy 107 and the other modules 108a and 108b. The conference session module 108c performs functions to bridge the plurality of end point devices participating in a media-based conference call or meeting into a single session. In some embodiments, the conference session module 108c is a multipoint control unit (MCU). An example MCU that can be incorporated into the conference session module 108c is Codian, available from Cisco Systems, Inc. in San Jose, Calif. The MCU can be integrated with Vidtel Gateway, available from Vidtel, Inc. of Sunnyvale, Calif., to provide additional features.

The system 100 also includes a database 110. The database 110 is coupled to the server computing device 106 and stores data used by the server computing device 106 to perform the media-based conferencing functionality. The database 110 can be integrated with the server computing device 106 or be located on a separate computing device. An example database that can be used with the system 100 is MySQL™ available from Oracle Corp. of Redwood City, Calif.

Figure 2:
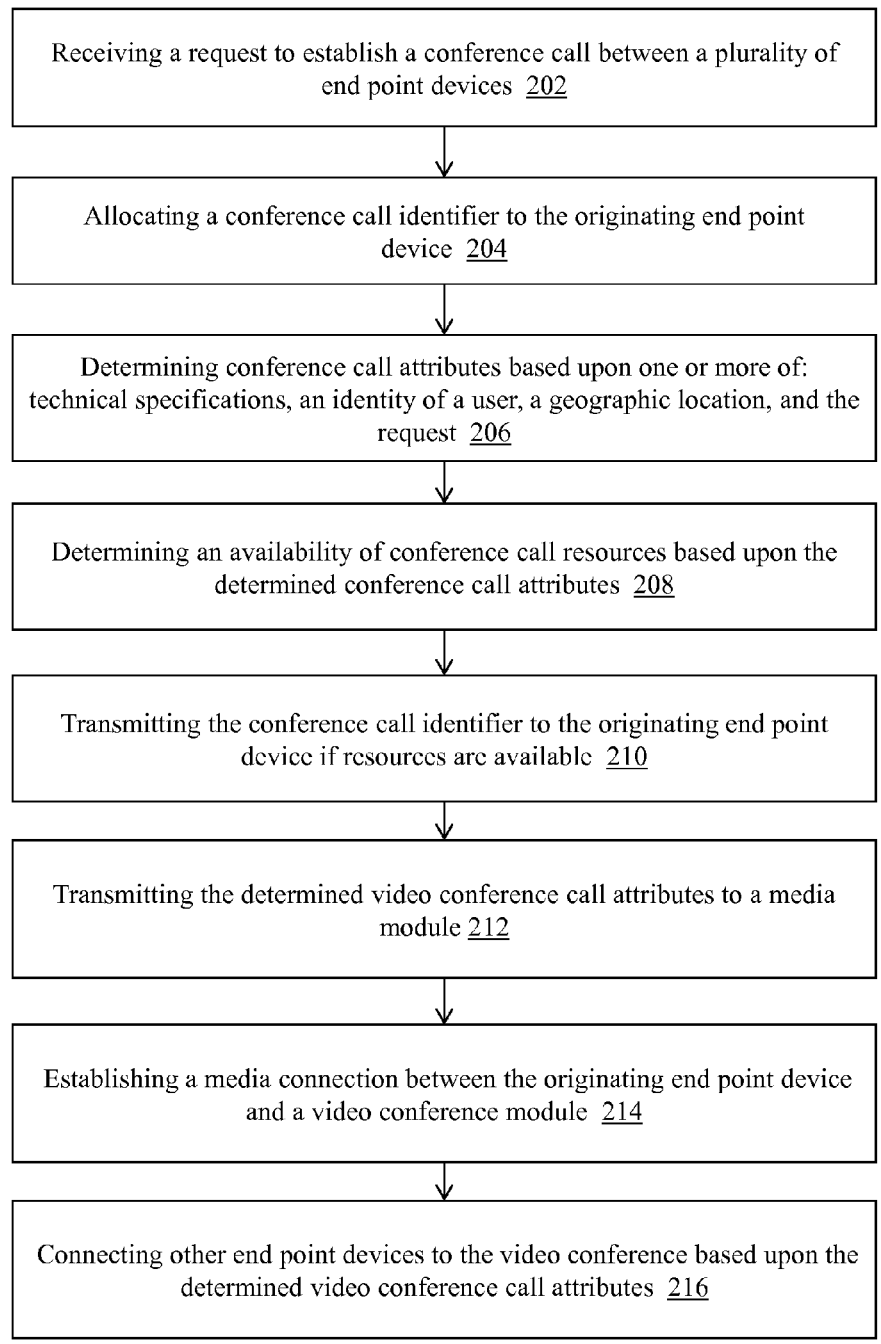
FIG. 2 is a flow diagram of a method for media-based conferencing between a plurality of end point devices, according to an embodiment of the invention.

FIG. 2 is a flow diagram of a method 200 for media-based conferencing between a plurality of end point devices, using the system 100 of FIG. 1. The call processing module 108a of the server computing device 106 receives (202) a request to establish a conference call between a plurality of end point devices (e.g., 102a-102b). The request originates from one of the end point devices (e.g., 102a). For example, in the SIP context, the originating end point device 102a transmits a SIP INVITE message to the server computing device 106 via the network 104. The proxy 107 receives the SIP INVITE message and, in some embodiments, translates the SIP INVITE message into XML, which is then passed on to the call processing module 108a.

The call processing module 108a allocates (204) a conference call resource identifier to the originating end point device 102a, based upon the received XML request. As will be described in greater detail below, the call processing module 108a also determines the availability of resources for the conference call and transmits the conference call resource identifier to the originating end point device 102a only if specified and/or necessary resources are available.

The call processing module 108a determines (206) conference call attributes based upon one or more of: technical specifications of the originating end point device 102a, an identity of a user associated with the originating end point device 102a, a geographic location of the originating end point device, and the request to establish the conference call. As described above, the call processing module 108a receives the request in XML format from the proxy 107 and evaluates data embedded in the request to determine processing for the conference call request. For example, the call processing module 108a can evaluate the origination address (e.g., 'from' address) in the request to identify a user of the end point device 102a in order to perform functions such as authentication, group permissions, feature access, and the like. In another example, the call processing module 108a can evaluate the request to determine certain technical attributes of the originating and/or destination end point devices. For instance, if the call request originates at a mobile device and/or via a cellular network, the call processing module 108a can determine extra and/or different call security options (e.g., encryption). In another example, the call processing module 108a can evaluate the geographic location of the originating end point device 102a to determine appropriate routing rules, security authorizations, and/or hardware/software resources to allocate to the originating end point device 102a or the conference call itself. It should be appreciated that the call processing module 108a can analyze the request to establish a conference call to determine attributes associated with the call and/or attributes that the module 108a should assign to the call as the request arrives.

As mentioned above, the call processing module 108a determines (208) an availability of resources based upon the conference call attributes. For example, the call processing module 108a determines a resource (e.g., gateway, URI) available for the requested conference call and generates a conference call resource identifier to be assigned to the originating end point device 102a. For example, if the originating end point device 102a is using a particular software platform (e.g., Skype™) to initiate the media-based conference call, the call processing module 108a generates a Skype™ URI to be associated with the end point device 102a. In some embodiments, if a particular resource is unavailable (e.g., all of the Skype™ URIs are in use), the call processing module 108a can inform the originating end point device 102a and wait until a resource is available or decline to establish the conference call.

The call processing module 108a can then transmit (210) the conference call identifier (e.g., URI) to the end point device 102a for redirection of the call signaling to a server associated with the software platform. In some embodiments, the conference call resource identifier is associated with resources internal to the system 100 that can handle and process the call signaling (e.g., an internal gateway, transcoder).

The call processing module 108a transmits (212) the determined conference call attributes to the media module 108b. For example, the call processing module 108a can transmit the determined conference call attributes (e.g., via XML) to the media module 108b for providing features such as call enhancement functionality, call routing functionality, media streaming functionality, and call termination functionality.

The media module 108b establishes (214) a conference media connection between the originating end point device 102a and the conference session module 108c for initiation of a conference media flow. In some embodiments, once the call processing module 108a has established the signaling connection and performed various functions (e.g., authentication, permissioning, routing), the media module 108b initiates a media flow between the originating end point device 102a and the conference session module 108c at the server computing device 106. The media module 108b can still manage the call state and media streaming, while the conference session module 108c connects (216) the various end point devices participating in the conference call to the conference call session. In some embodiments, the conference session module 108c uses the determined conference call attributes to determine whether certain end point devices are able to connect to the conference call.

Figure 3:
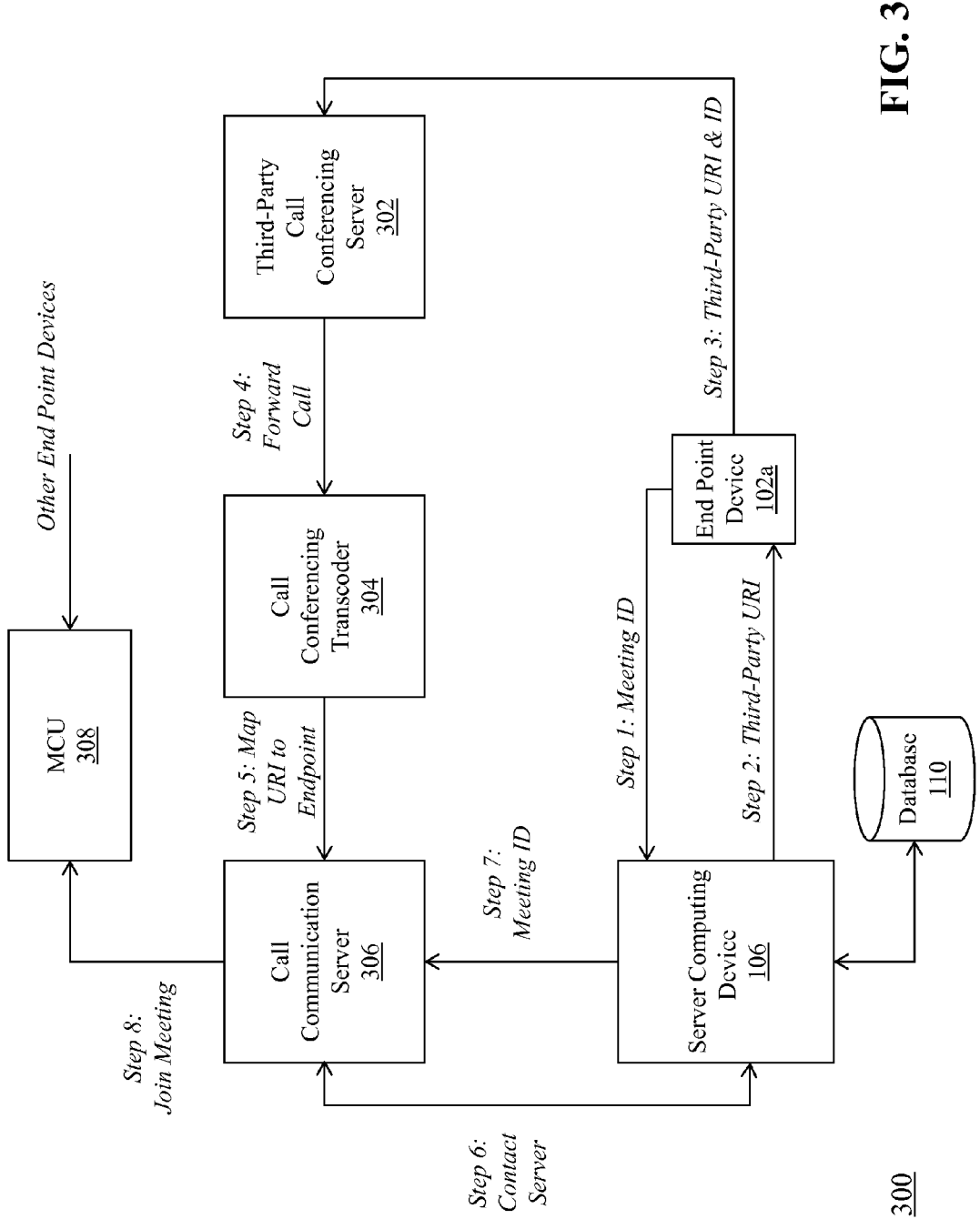
FIG. 3 is a block diagram of a system for media-based conferencing between a plurality of end points, according to an embodiment of the invention

FIG. 3 is a block diagram of a system 300 for media-based conferencing between a plurality of end points, based upon the system 100 of FIG. 1. The system 300 includes the end point device 102a, the server computing device 106, the database 110, a third-party call conferencing server computing device 302, a call conferencing transcoder 304, a media-based communication server (MCS) computing device 306, and a MCU 308.

FIG. 3 depicts an example workflow for establishing a media-based conference call between a plurality of end point devices:

Step 1: the end point device 102a transmits a request to establish a media-based conference call to the server computing device 106. The request includes a meeting ID. For example, if the end point device 102a is operating via Skype™ client software, a user at the device 102a clicks a button in the Skype™ user interface to initiate the conference call. The software transmits the user's Skype™ ID and the meeting ID to the server computing device 106 to establish a signaling session with the server 106.

Step 2: the server computing device 106 processes the request to determine the identity of the user associated with the request. For example, the server 106 can retrieve a user ID from the request and use the database 110 to determine the identity of the user and any related information (e.g., permissions, device-specific information, and authentication details). The server can check whether the user associated with the user ID is authorized to join the meeting requested (via the meeting ID). The server computing device 106 then returns a Skype™ URI to the end point device 102a.

Step 3: the end point device 102a uses the received URI to initiate a signaling session for the conference call with a Skype™ server (e.g., third-party call conferencing server 302). The URI can include an address or identifier associated with the call conferencing transcoder (e.g., device 304), the media-based communication server (e.g., device 306), and/or the MCU 308. In some embodiments, the URI corresponds to an MCS endpoint and the server computing device 106/database 110 maintains a correspondence between the third-party URI and the MCS endpoint.

Step 4: the third-party call conferencing server 302 forwards the conference call signaling to the call conferencing transcoder 304 (e.g., a Vidtel module).

Step 5: the call conferencing transcoder 304 maps the received Skype™ URI to an MCS endpoint address. For example, the transcoder 304 can modified the user's Skype™ ID to add the MCS end point address (e.g., <user's Skype™ ID>@skype.vidtel.com). The transcoder 304 then communicates with the MCS 306.

Step 6: the MCS 306 communicates with the server computing device 106. For example, the MCS 306 transmits the modified Skype™ ID that includes the MCS end point address to the server computing device 106.

Step 7: the server 106 uses the modified ID to locate the meeting ID that was previously transmitted to the server 106 by the end point device 102 (see Step 1). The server 106 then transmits the meeting ID to the MCS 306.

Step 8: the MCS 306 then transfers the conference call signaling for the end point device 102a to the MCU 308 so that the user can join the media-based conference call or meeting, as requested.

It should be appreciated that FIG. 3 represents an exemplary embodiment for establishing a media-based conference call between a plurality of end point devices. Other techniques and workflows for establishing a media-based conference call between a plurality of end point devices can be contemplated without departing from the scope of invention.

In some embodiments, the system 100 is capable of providing interoperability between different types of end point devices that request to join the same media-based conference call. For example, an end point device 102a may access the system 100 via a Skype™ user interface over a cellular network while another end point device 102b may access the system via a call conferencing terminal installed behind a VoIP architecture, e.g., at a company. The server computing device 106 can perform transcoding between the respective end point devices to enable a seamless communication session. In some embodiments, the server computing device 106 reserves system resources depending on the type of request and/or end point device that is accessing the system. The server computing device 106 can maintain a pool of access so that system resources are reserved and released as appropriate based upon the initiation and termination of media-based conference calls and meetings.

Figure 4:
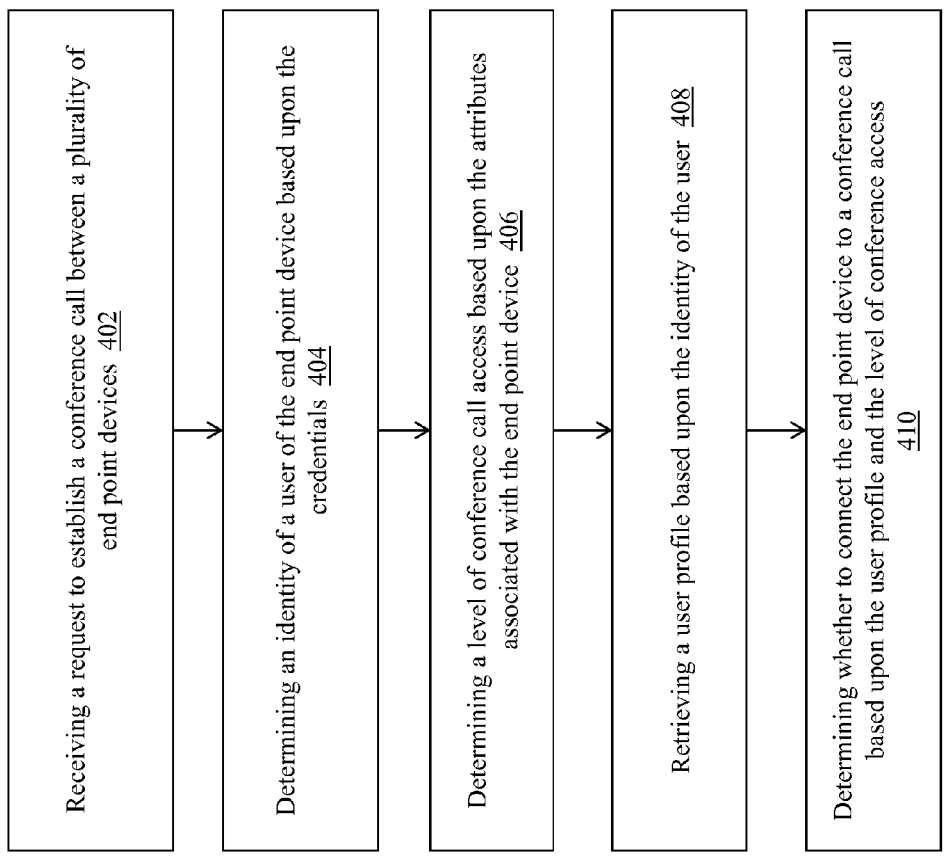
FIG. 4 is a flow diagram of a method for authenticating an end point device participating in a conference call, according to an embodiment of the invention.

FIG. 4 is a flow diagram of a method for authenticating an end point device participating in a media-based conference call, using the system 100 of FIG. 1. The call processing module 108a of the server computing device 106 receives (402) receives a request to establish a conference call between a plurality of end point devices (e.g., end point devices 102a-102b), the request including credentials associated with a user of an end point device (e.g., 102a) and attributes associated with the end point device 102a. The call processing module 108a determines (404) an identity of the user of the end point device based upon the credentials. The call processing module 108a determines (406) a level of conference call access based upon the attributes associated with the end point device. The call processing module 108a retrieves (408) a user profile based upon the identity of the user, the user profile including a set of permissions associated with conference call functionality. The call processing module 108a determines (410) whether to connect the end point device to a conference call based upon the user profile and the level of conference call access.

For example, the server computing device 106 can perform multi-factor authentication to determine (i) the identity of both the user and end point device that has initiated the request to establish a conference call and (ii) how the server 106 should handle the request (e.g., connect the call, route the call to another resource in the system for further processing, authenticate the user via additional means). In one example, the server computing device 106 can fingerprint the incoming request by evaluating attributes relating to a user of the end point device, the end point device itself, and/or the parameters of the requested call to create a matrix of the attributes that comprise the fingerprint. The server 106 can store the fingerprint, e.g., in the database 110 so that the fingerprint can be referenced in the future—both in comparison with requests from the same user/end point device and from different users/end point devices. The server computing device 106 can also re-evaluate the fingerprint as a conference call proceeds after establishment. For example, if the end point device is attempting to access the conference call system in an unauthorized manner by providing a temporary, fake alias to the server 106 upon transmitting the call request, but later during the call the end point device attributes change, the server 106 can dynamically and automatically evaluate the fingerprint again and take corrective action (e.g., disconnecting the call, routing the call to another resource for monitoring) if necessary.

In some embodiments, the multi-factor authentication is implemented according to two facets: (1) technically (i.e., how/why is the end point device calling?) and (2) personally (i.e., who is the user at the end point device?). The server computing device 106 can receive a request for a media-based conference from an end point device and determine items such as technical features of the calling device (e.g., hardware, software, location, originating network, protocol) and personal features of the calling device and/or the user associated with the device (e.g., user name, ID, PIN, facial recognition). The server computing device 106 can evaluate both sets of information to provide a robust authentication process that ensures appropriate access and permissions are granted to the end point device.

The system 100 is also capable of performing authentication both at an individual permission level and a call/meeting permission level. For example, the server computing device 106 can retrieve individual permissions from the database 110, e.g., based upon a Lightweight Directory Access Protocol (LDAP) or Active Directory (AD) service. The server computing device 106 can tie in to an organization's internal user profile and directory service to use the user information for managing call conferencing permissions. The server computing device 106 can also maintain and manage call/meeting permissions, such as generating or storing a list of participants that are eligible to join a particular conference call or meeting, e.g., based upon user identifier, job title, access level, or other such parameters as may be defined in relation to the user.

The system 100 has a robust permissioning scheme that allows for customized authentication and permissions at a functional level, a personal level, a group level, and/or a device level. For the functional permissions, the system 100 can determine that a particular user/end point device/conference call is able to execute certain functions, e.g., set up a sub-conference, establish a conference call, invite participants, implement security attributes, and so forth. For the personal permissions, the system 100 enables a granularity of access controls for a particular user. For example, the system 100 can determine that a user has permission to initiate a conference call of a particular type, from a particular location (e.g., work but not home), to particular people, and the like.

For the group permissions, the system 100 can assign attributes to a plurality of users based upon any number of different requirements or categorizations. For example, all of the employees in a corporation can be assigned to a group. The system 100 can also assign users to multiple groups and/or sub-groups, such as business units within the corporation or product teams within the business unit. Users can also form their own ad-hoc groups (e.g., friends, business contacts) comprising any number of users, e.g., from two users and up. It should be noted that the users do not have to be otherwise affiliated (e.g., by employer) in order to be in a group. For the device permissions, the system 100 can determine a level of access and functionality for particular call environments (e.g., hardware and/or software platform (or other technical attributes) of an end point device, location of an end point device, and so forth).

Another aspect of the permissioning structure described herein is the hierarchical nature of the permissions. For example, a corporation may assign all of its employees to a particular group with specifically-designated permission levels. Certain employees within that group may form a sub-group and want a permission level that differs from the corporation-wide permission structure. The system 100 can determine that the corporation-wide permission structure overrides the sub-group permission level, and enforce limits on the sub-group permission level so as to not exceed the scope of or conflict with the corporate-wide permissions structure.

In some scenarios, participants to a main conference call may wish to separate themselves from the conference for a brief period to communicate regarding private matters. For example, if the main conference call involves business negotiations or legal proceedings with multiple parties, one party may want to confer regarding sensitive or privileged issues without disconnecting from the main conference but still engaging in a private conversation. Therefore, the system offers a function to establish a sub-conference between multiple end point devices, and the system can apply all of the functionality described above (e.g., authentication, routing, and permissioning) to the sub-conference.

Figure 5:
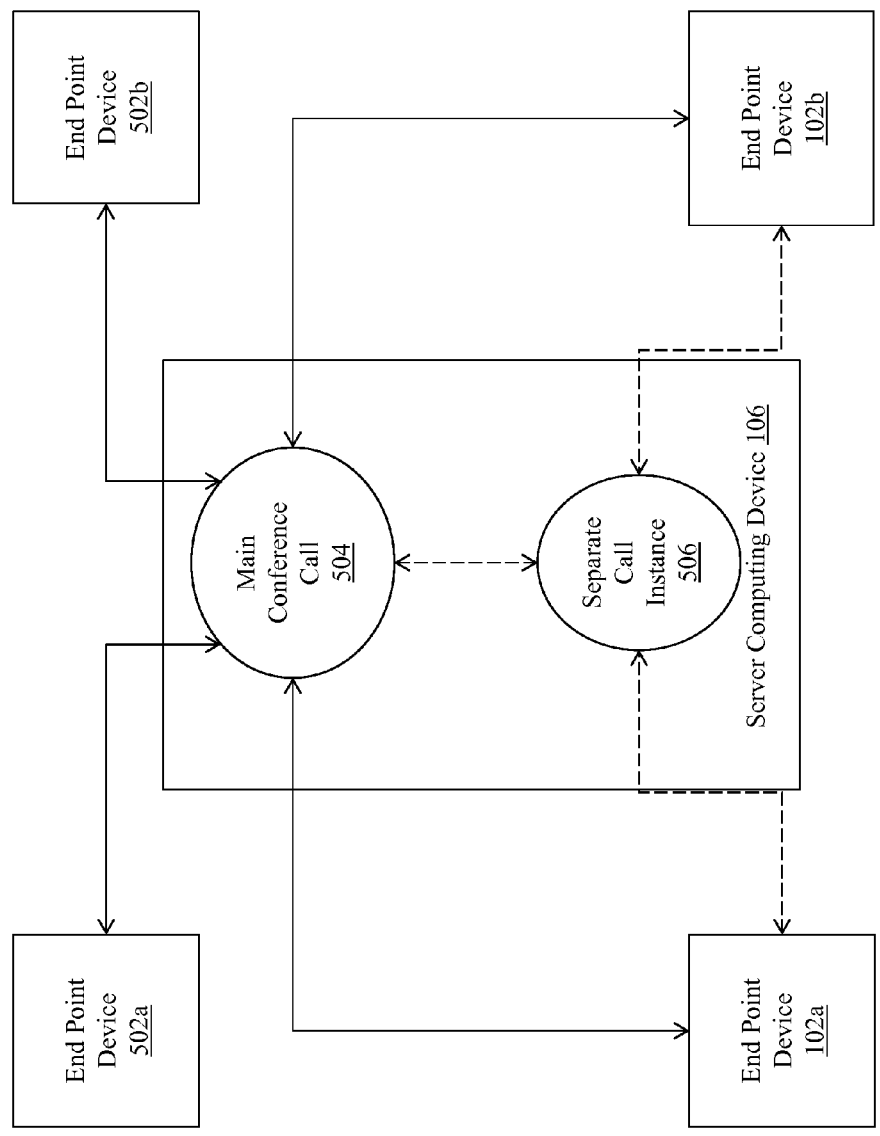
FIG. 5 is a block diagram of a system for establishing a sub-conference between a plurality of end point devices participating in a conference call, according to an embodiment of the invention.

FIG. 5 is a block diagram of a system 500 for establishing a sub-conference between a plurality of end point devices (e.g., end point devices 102*a*, 102*b*, 602*a*, 602*b*) participating in a media-based conference call, based upon the system of FIG. 1. The system 500 includes end point devices 102*a*, 102*b*, 502*a*, 502*b*, and server computing device 106. The end point devices 102*a*, 102*b*, 502*a*, 502*b* connect to the main conference call 504 using the techniques described above. Once the main conference call 504 is established, certain participants may wish to separate themselves from the main call 504 for a period of time.

Figure 6:
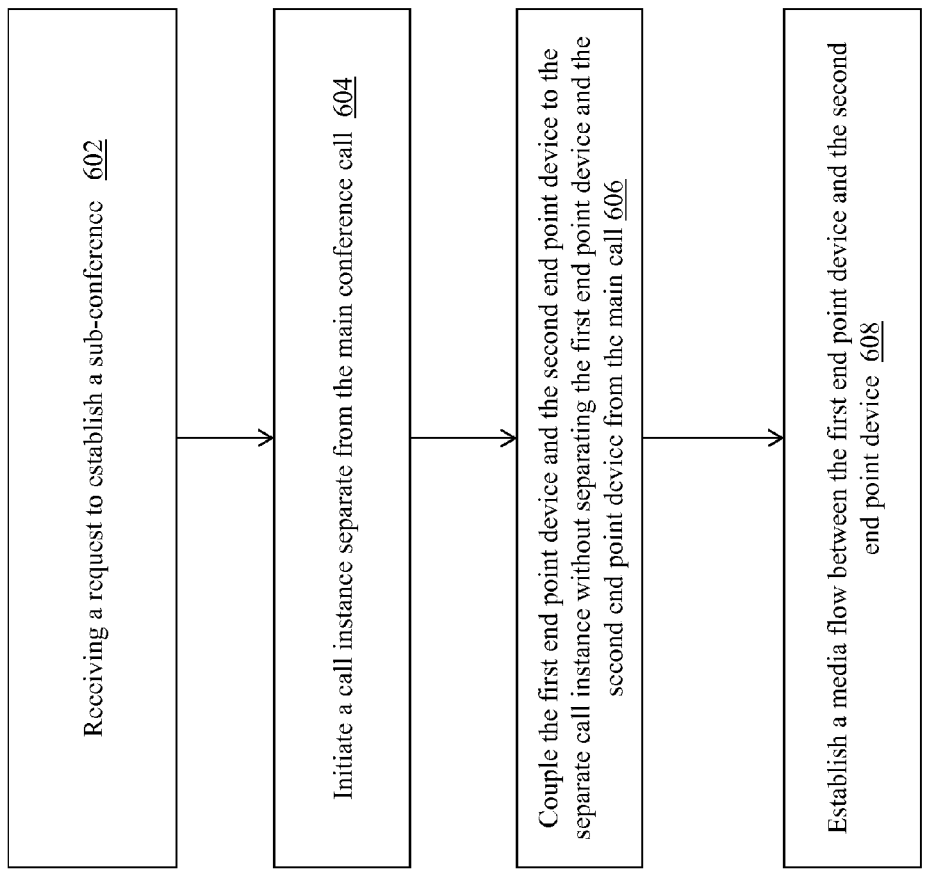
FIG. 6 is a flow diagram of a method for establishing a sub-conference between a plurality of end point devices participating in a conference call, according to an embodiment of the invention.

FIG. 6 is a flow diagram of a method 600 for establishing a sub-conference between a plurality of end point devices participating in a media-based conference call, using the system 100 of FIG. 1 and the system 500 of FIG. 5. The server computing device 106 receives (602) a request to establish a sub-conference from a first end point device (e.g., end point device 102*a*) participating in a main conference call. The request includes an identifier associated with a second end point device (e.g., end point device 102*b*) participating in the main conference call. For example, the user at end point device 102*a* may click on an icon associated with a user at end point device 102*b* to initiate a sub-conference with the user at end point device 102*b*, and the device 102*a* transmits a request to the server computing device 106.

The server computing device 106 initiates (604) a call instance (e.g., separate call instance 506) that is separate from the main conference call 504 based upon the request to establish the sub-conference. For example, the server computing device 106 can initiate separate call instance 506 by allocating another meeting that is managed by the server 106 but where the media flow is separate from the main conference call 504. In some embodiments, only a portion of the media flow is transferred to the separate call instance 506. For example, the participants in the main conference call may continue to see video associated with the users involved in the sub-conference, but the audio communication exchanged between the users involved in the sub-conference is excluded from the main conference call 504. In another example, the participants in the main conference call may hear a tone indicating that some users have initiated a sub-conference. In some embodiments, the sub-conference include the exchange of textual information (e.g., chat) between the participants in the sub-conference.

In some embodiments, the server computing device 106 changes presence information associated with the users and/or end point devices that joined the sub-conference. For example, the server computing device 106 can add a status indicator to a user's name or picture in a video conference indicating to all participants in the main conference call that the user is in a sub-conference. In another example, the server computing device 106 can periodically play an audio message to participants in the main conference call that certain users have entered a sub-conference and identify those users by name.

The server computing device 106 couples (606) the first end point device 102*a* and the second end point device 102*b* to the separate call instance 506 without separating the first end point device 102*a* and the second end point device 102*b* from the main conference call 504. The server computing device 106 establishes (608) a media flow between the first end point device 102*a* and the second end point device 102*b*, where the main conference call 504 is prevented from accessing the media flow between the first end point device 102*a* and the second end point device 102*b*.

The server computing device 106 can apply any of the concepts described above with respect to call routing, enhancement features, permissions, authentication, and the like to the sub-conference call instance 506. For example, if a participant in the main conference call seeks to establish a sub-conference with another participant, the server 106 can determine whether the first participant is allowed to communicate privately with the second participant, e.g., via a set of rules stored in the database 110. The rules can be pre-determined in advance of the main conference call or agreed upon by the participants at the time of the call. The rules can change during the course of the call, e.g., as participants come and go from the main conference call. The permissions and related features can be hierarchical across the main conference call and the sub-conferences, so that a user has the same permission scope in each call instance, or in some embodiments, a user may have reduced permission scope in a sub-conference versus his permission scope in a main conference call.

It should be noted that, in some embodiments, the server computing device 106 keeps track of the status of each participant in the conference call. For example, the server 106 records certain data about the circumstances in which the users entered the sub-conference (e.g., time at which the sub-conference was initiated, identify of users in the sub-conference, how long the sub-conference lasted, and the like). This feature allows for detailed reporting about the structure and timing of the conference call, which is useful for audit and compliance purposes.

In certain contexts, the rules provide for certain surveillance and reporting features to be applied to the sub-conferences. For example, an industry may be regulated such that all communications must be recorded and documented according to specific guidelines. The server computing device 106 can determine, based upon the rules, whether to record the sub-conferences, identify the participants to the sub-conferences, and other similar requirements. In some cases, the rules applied to the main conference call are automatically transferred to the sub-conferences. In addition, the system can provide additional features such as surveillance or reporting to be used in conjunction with the sub-conference.

In addition, an advantage provided by the methods and systems described herein is that each end point device (e.g., device 102*a* of FIG. 1) has its own media stream when participating in a conference call. Accordingly, the server computing device 106 and/or other intermediary servers and devices can insert artifacts that are personalized or specific to the user of a certain end point device (e.g., notifications, alerts, messages, graphics) without inserting the artifacts into the media streams of other end point devices. This technique enables the system 100 to perform dynamic and personalized user interface, recording, and display operations for individual users.

Figure 7:
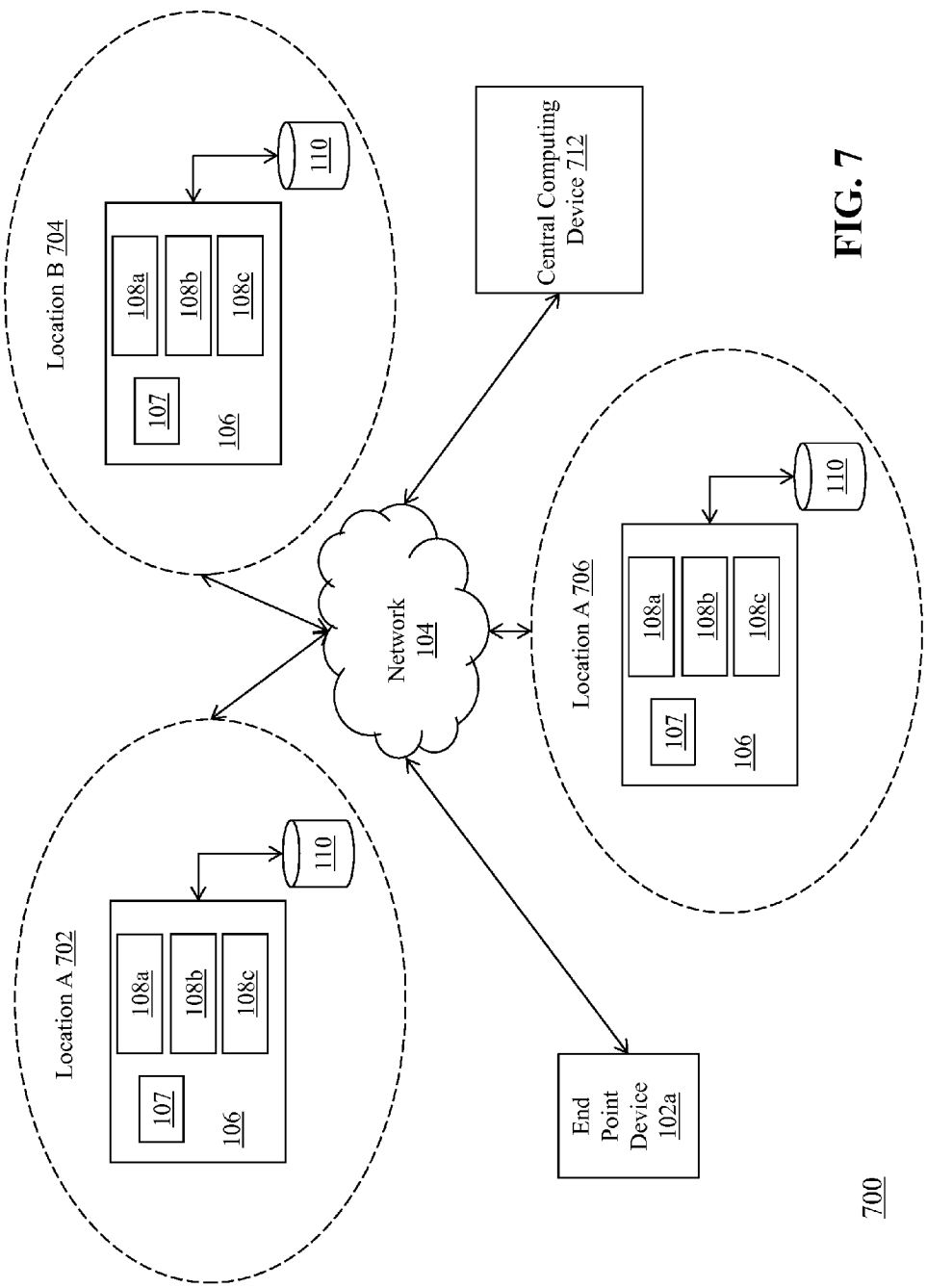
FIG. 7 is a block diagram of a networked system for media-based conferencing between a plurality of end points, according to an embodiment of the invention.

The techniques may be implemented in a networked system 700 comprising multiple computing devices distributed across different locations, as shown in FIG. 7. Each of Location A 702, Location B 704 and Location C 706 includes the server computing device 106 having components 107, 108*a*-108*c*, and 110 of FIG. 1, and the servers at locations 702, 704, and 706 are connected to each other via the network 104. The networked system of FIG. 7 enables distribution of the processing functions described herein across several computing devices and provides redundancy in the event that a computing device at one location is offline or inoperable. In some embodiments, end point devices (e.g., device 102*a*) in proximity to a particular location (e.g., Location A 702) access the networked system via the server 106 at that location. In some embodiments, the server computing devices 106 at the respective locations 702, 704, 706 communicate with a central computing device 712 (e.g., a server) that is coupled to the network. The central computing device 712 can provide data and/or processing resources for the network of computing devices 106 (e.g., synchronization of functionality/data across the computing devices).

It should be understood that any of the above-described methods, systems, and techniques can be implemented in the context of video conferencing (i.e., conference calls consisting of video and audio media) and audio-only conferencing without departing from the scope of invention.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VoIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A computerized method for media-based conferencing between a plurality of end point devices, the method comprising:
   receiving, at a first call processing module in a server computing device, a request to establish a conference call between a plurality of end point devices, the request received from an originating end point device;
   allocating, by the first call processing module, a conference call resource identifier to the originating end point device;
   determining, by the first call processing module, first conference call attributes based upon one or more of: technical specifications of the originating end point device, an identity of a user associated with the originating end point device, a geographic location of the originating end point device, and the request to establish the conference call;
   determining, by the first call processing module, an availability of conference call resources based upon the first conference call attributes;
   transmitting, by the first call processing module, the conference call resource identifier to the originating end point device if conference call resources are available;
   transmitting, by the first call processing module, the first conference call attributes to a first media module in the server computing device;
   selecting, by the first call processing module, a conference session module in the server computing device to host the conference call based upon analysis of second conference call attributes associated with each other end point device;
   establishing, by the first media module, a first media flow between the originating end point device and the selected conference session module for initiation of a conference media flow; and
   connecting, by the conference session module, the other end point devices to the conference call based upon the second conference call attributes, wherein media flows from the other end point devices are joined to the conference media flow at the conference session module via at least one media module other than the first media module and at least one call processing module other than the first call processing module.

2. The method of claim 1, wherein the request to establish a conference call includes an originating end point identifier, a destination end point identifier, a conference identifier, a signaling protocol attribute, a conference call hardware platform used by the originating end point device, and a conference call software platform used by the originating end point device.

3. The method of claim 1, further comprising mapping, by the first call processing module, the originating end point device to the identity of the user associated with the originating end point device.

4. The method of claim 1, wherein the step of determining conference call attributes further comprises determining, from a database coupled to the first call processing module, permissions for the user associated with the originating end point device based upon the identity of the user associated with the originating end point device.

5. The method of claim 4, wherein the permissions define access to conference call routing functions provided by the server computing device, access to conference call enhancement functions provided by the server computing device, access to conference call recipients, access to hardware resources provided by the server computing device, and access to software resources provided by the server computing device.

6. The method of claim 1, wherein the conference call resource identifier is associated with a conference call software platform used by the originating end point device to transmit the request to establish the conference call.

7. The method of claim 1, wherein the connecting step comprises receiving, by the conference session module, requests from other end point devices to join the conference call.

8. The method of claim 1, further comprising modifying, by the first call processing module, the conference call resource identifier based upon a destination end point identifier associated with the request to establish the conference call.

9. The method of claim 1, wherein the step of establishing a signaling connection further comprises translating, by the first media module, a first signaling protocol used by the originating end point device into a second signaling protocol used by the conference call.

10. The method of claim 1, wherein the request to establish a conference call includes user identification credentials associated with the user of the originating end point device.

11. The method of claim 10, further comprising authenticating, by the first call processing module, the user of the originating end point device based upon the user identification credentials.

12. The method of claim 1, wherein the originating end point device operates a different conference call software platform than at least one of the other end point devices.

13. The method of claim 1, wherein the server computing device is comprised of a plurality of independent, geographically-dispersed nodes.

14. A system for media-based conferencing between a plurality of end point devices, the system comprising:
a server computing device comprising a processor and a memory module, the server computing device configured to:
receive, at a first call processing module in the server computing device, a request to establish a conference call between a plurality of end point devices, the request received from an originating end point device;
allocate, by the first call processing module, a conference call resource identifier to the originating end point device;
determine, by the first call processing module, first conference call attributes based upon one or more of: technical specifications of the originating end point device, an identity of a user associated with the originating end point device, a geographic location of the originating end point device, and the request to establish the conference call;
determine, by the first call processing module, an availability of conference call resources based upon the first conference call attributes;
transmit, by the first call processing module, the conference call resource identifier to the originating end point device if conference call resources are available;
transmit, by the first call processing module, the first conference call attributes to a first media module in the server computing device;
select, by the first call processing module, a conference session module in the server computing device to host the conference call based upon analysis of second conference call attributes associated with each other end point device;
establish, by the first media module, a first media flow between the originating end point device and the selected conference session module in the server computing device for initiation of a conference media flow; and
connect, by the conference session module, the other end point devices to the conference call based upon the second conference call attributes, wherein media flows from the other end point devices are joined to the conference media flow at the conference session module via at least one media module other than the first media module and at least one call processing module other than the first call processing module.

15. The system of claim 14, wherein the request to establish a conference call includes an originating end point identifier, a destination end point identifier, a conference identifier, a signaling protocol attribute, a conference call hardware platform used by the originating end point device, and a conference call software platform used by the originating end point device.

16. The system of claim 14, further comprising mapping, by the first call processing module, the originating end point device to the identity of the user associated with the originating end point device.

17. The system of claim 14, wherein the step of determining conference call attributes further comprises determining, from a database coupled to the first call processing module, permissions for the user associated with the originating end point device based upon the identity of the user associated with the originating end point device.

18. The system of claim 17, wherein the permissions define access to conference call routing functions provided by the server computing device, access to conference call enhancement functions provided by the server computing device, access to conference call recipients, access to hardware resources provided by the server computing device, and access to software resources provided by the server computing device.

19. The system of claim 14, wherein the conference call resource identifier is associated with a conference call software platform used by the originating end point device to transmit the request to establish the conference call.

20. The system of claim 14, wherein the connecting step comprises receiving, by the conference session module, requests from other end point devices to join the conference call.

21. The system of claim 14, further comprising modifying, by the first call processing module, the conference call resource identifier based upon a destination end point identifier associated with the request to establish the conference call.

22. The system of claim 14, wherein the step of establishing a signaling connection further comprises translating, by the first media module, a first signaling protocol used by the originating end point device into a second signaling protocol used by the conference call.

23. The system of claim 14, wherein the request to establish a conference call includes user identification credentials associated with the user of the originating end point device.

24. The system of claim 23, wherein the first call processing module is further configured to authenticate the user of the originating end point device based upon the user identification credentials.

25. The system of claim 14, wherein the originating end point device operates a different conference call software platform than at least one of the other end point devices.

26. The system of claim 14, wherein the server computing device is comprised of a plurality of independent, geographically-dispersed nodes.

27. A computer program product, tangibly embodied in a non-transitory computer readable storage device, for media-based conferencing between a plurality of end point devices, the computer program product including instructions operable to cause a server computing device to:

receive, at a first call processing module in the server computing device, a request to establish a conference call between a plurality of end point devices, the request received from an originating end point device;

allocate, by the first call processing module, a conference call resource identifier to the originating end point device;

determine, by the first call processing module, first conference call attributes based upon one or more of: technical specifications of the originating end point device, an identity of a user associated with the originating end point device, a geographic location of the originating end point device, and the request to establish the conference call;

determine, by the first call processing module, an availability of conference call resources based upon the first conference call attributes;

transmit, by the call processing module, the conference call resource identifier to the originating end point device if conference call resources are available;

transmit, by the first call processing module, the first conference call attributes to a first media module in the server computing device;

select, by the first call processing module, a conference session module in the server computing device to host the conference call based upon analysis of second conference call attributes associated with each other end point device;

establish, by the first media module, a first media flow between the originating end point device and the conference session module for initiation of a conference media flow; and connect, by the conference session module, the other end point devices to the conference call based upon the second conference call attributes, wherein media flows from the other end point devices are joined to the conference media flow at the conference session module via at least one media module other than the first media module and at least one call processing module other than the first call processing module.

\* \* \* \* \*